United States Patent
Wienkes et al.

(10) Patent No.: US 11,525,841 B2
(45) Date of Patent: Dec. 13, 2022

(54) SYSTEM AND METHOD FOR DERIVING AIRSPEED FROM A PARTICLE SENSOR

(71) Applicant: Honeywell International Inc., Morris Plains, NJ (US)

(72) Inventors: Lee R. Wienkes, Minneapolis, MN (US); Matthew Wiebold, Northfield, MN (US); Xiao Zhu Fan, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 1274 days.

(21) Appl. No.: 15/957,629

(22) Filed: Apr. 19, 2018

(65) Prior Publication Data

US 2019/0324051 A1    Oct. 24, 2019

(51) Int. Cl.
*G01P 5/26* (2006.01)
*G01N 15/02* (2006.01)
*G01F 1/7086* (2022.01)

(52) U.S. Cl.
CPC .............. *G01P 5/26* (2013.01); *G01F 1/7086* (2013.01); *G01N 15/0205* (2013.01)

(58) Field of Classification Search
None
See application file for complete search history.

(56) References Cited

U.S. PATENT DOCUMENTS

| | | |
|---|---|---|
| 5,000,566 A | 3/1991 | Kuppenheimer et al. |
| 5,793,478 A | 8/1998 | Rader et al. |
| 6,580,503 B2 | 6/2003 | Gharib et al. |
| 2006/0262324 A1* | 11/2006 | Hays .......................... G01P 5/26 356/519 |

(Continued)

FOREIGN PATENT DOCUMENTS

| | | |
|---|---|---|
| EP | 0887636 A1 | 12/1998 |
| WO | 2018009599 A1 | 1/2018 |

OTHER PUBLICATIONS

European Patent Office, "Communication pursuant to Article 94(3) from EP Application No. 19169125.2", from Foreign Counterpart to U.S. Appl. No. 15/957,629, filed Aug. 13, 2020, pp. 1 through 9, Published: EP.

(Continued)

*Primary Examiner* — Hovhannes Baghdasaryan
(74) *Attorney, Agent, or Firm* — Fogg & Powers LLC

(57) ABSTRACT

A system comprises a particle sensor assembly, which includes a light source that transmits a light beam into an external interrogation air region; a set of receive optics that provides a receive channel, the receive optics configured to collect a scattered portion of the light beam from a particle in the interrogation air region; and an optical detector that receives the collected scattered portion. The optical detector measures a signal intensity as a function of time from the scattered portion, with the signal intensity indicating a particle size and a signal duration indicating motion of the particle through the interrogation air region. A processor is in communication with the optical detector and is operative to determine a transit time of the particle through the interrogation air region based on the signal duration, and compute an airspeed based on parameters comprising the transit time and a size of the light beam.

15 Claims, 3 Drawing Sheets

(56) References Cited

U.S. PATENT DOCUMENTS

| | | |
|---|---|---|
| 2011/0219869 A1 | 9/2011 | Asahara et al. |
| 2014/0046510 A1* | 2/2014 | Randolph ............. G01P 13/045 |
| | | 701/14 |
| 2014/0268142 A1 | 9/2014 | Tropea et al. |
| 2016/0305872 A1 | 10/2016 | Kaye et al. |

OTHER PUBLICATIONS

Bogue et al., "Comparative Optical Measurements of Airspeed and Aerosols on a DC-8 Aircraft", Dated 1995, pp. 56.1-56.25, Publisher: IEEE.

European Patent Office, "Summons to attend oral proceedings pursuant to Rule 115(1) EPC from EP Application No. 19169125. 2", from Foreign Counterpart to U.S. Appl. No. 15/957,629, filed Sep. 9, 2021, pp. 1 through 12, Published: EP.

European Patent Office, "Extended European Search Report from EP Application No. 19169125.2 dated Aug. 20, 2019", from Foreign Counterpart to U.S. Appl. No. 15/957,629, pp. 1-12, Published: EP.

Wu, "Fast-moving suspended particles: measurements of their size and velocity", Applied Optics, Mar. 1977, pp. 596-600, vol. 16, No. 3.

* cited by examiner

SYSTEM AND METHOD FOR DERIVING AIRSPEED FROM A PARTICLE SENSOR

BACKGROUND

Optically detecting particulates in fluids typically utilizes a light source to illuminate a particle (or many particles), and a train of collection optics to receive the scattered light from the particles. The properties of the received light (e.g., intensity, phase, polarization, wavelength, etc.) are analyzed to derive the properties of the particles (e.g., size, shape, type, etc.).

For example, particle sensors are laser-based sensors that use a light scattering method to detect and count particles in a concentration range in a given environment, such as particles in air. In some particle sensors, as particles pass through the light beam, the light source becomes obscured, which is recorded on a light detector. The light is then analyzed and converted to an electrical signal providing particulate size and quantity.

Various air data systems are used on vehicles such as aircraft to measure airspeed. While these air data systems generally provide the air data needed for safe and efficient operation of these vehicles, there is a need for other systems that can be used to measure airspeed in order to improve reliability and safety through common mode failure avoidance.

SUMMARY

A system comprises a particle sensor assembly, which includes at least one light source configured to transmit a light beam into an external interrogation air region; a set of receive optics configured to provide at least one receive channel, the receive optics configured to collect a scattered portion of the transmitted light beam from at least one particle in the interrogation air region; and an optical detector in communication with the at least one receive channel and configured to receive the collected scattered portion of the transmitted light beam. The optical detector is operative to measure a signal intensity as a function of time from the scattered portion, with the signal intensity indicating a particle size and a signal duration indicating motion of the at least one particle through the interrogation air region. A processor is in communication with the optical detector and is operative to determine a transit time of the at least one particle through the interrogation air region based on the signal duration; and compute an airspeed based on parameters comprising the transit time and a size of the light beam.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
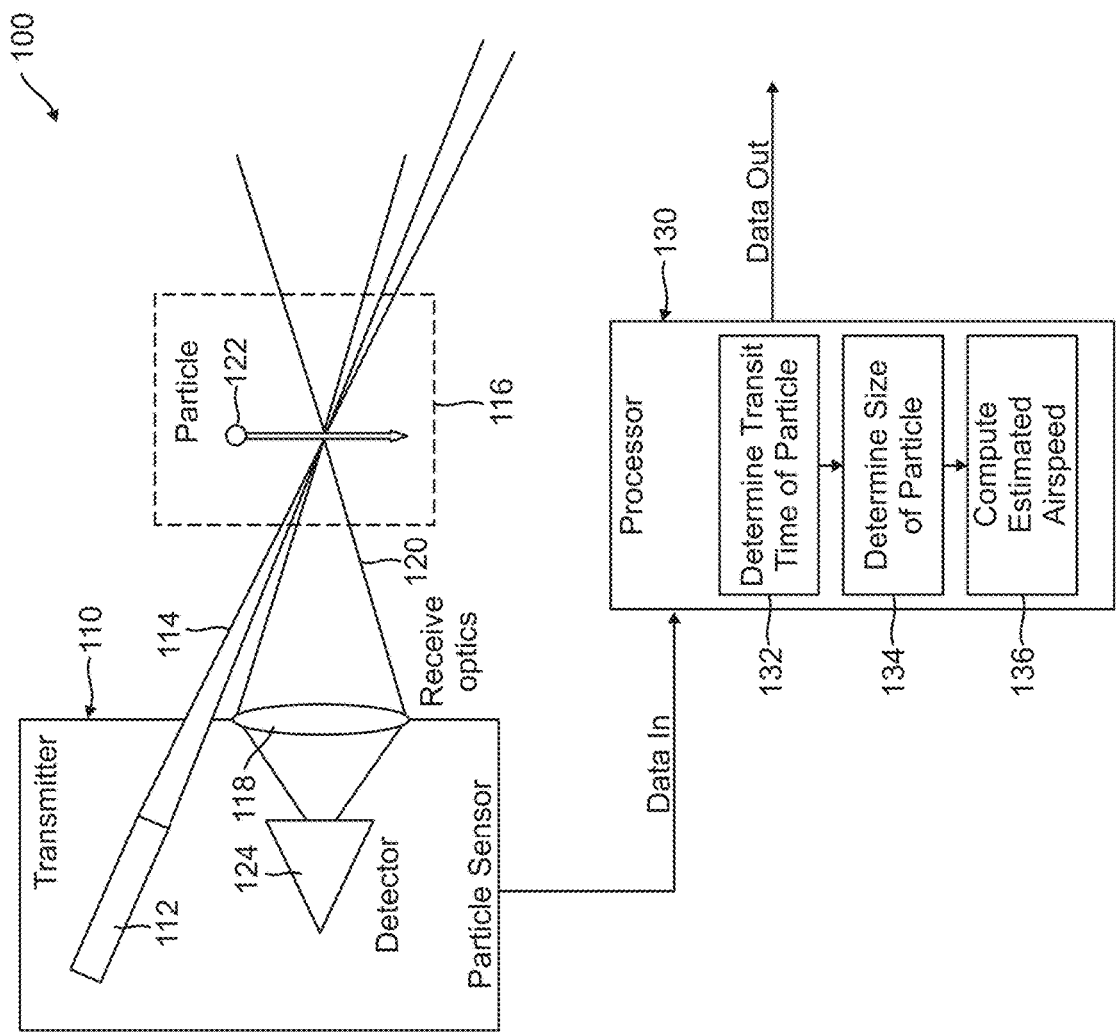
FIG. 1 is a block diagram of a system for deriving airspeed from a particle sensor, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for deriving airspeed from a particle sensor are disclosed herein. The particle sensor generally includes a light source such as a laser transmitter configured to transmit a light beam into an external interrogation air region, a set of receive optics configured to collect a scattered portion of the transmitted light beam from a particle in the air region, and an optical detector configured to receive the collected scattered portion of the light beam. The optical detector measures a signal intensity as a function of time from the scattered portion. The signal intensity indicates a particle size, and a signal duration indicates a time of flight of the particle through the air region.

The properties of the received light in the particle sensor are used to infer information about surrounding environmental conditions, including airspeed, using a processor coupled to the particle sensor. The processor is operative to determine a transit time of the particle through the air region based on the signal duration; determine a size of the particle based on the signal intensity; and compute an estimated airspeed based on the transit time, the size of the particle, and a size of the light beam.

The present method can be implemented by a software process that extracts the airspeed from particle transit times across the light beam of the particle sensor. The estimate of airspeed is computed for each particle individually and then can be averaged over many particles to obtain a more accurate answer.

In some implementations, particle by particle data is used from firmware of the optical detector, where the transit time of each particle is recorded. This allows for the derivation of true airspeed (TAS), and/or indicated airspeed (IAS), and/or calibrated airspeed (CAS), from the transit time and size of each particle. As more particles are measured, the accuracy of the estimate of true airspeed increases.

The present approach is beneficial, in that the estimate of airspeed can be used as a backup air data system with different failure modes, for existing air data systems such as deployed on vehicles such as aircraft, which adds a layer of redundancy to the existing air data systems. For example, the estimated airspeed can supplement, augment, or hint existing air data systems, to improve their reliability and safety through common mode failure avoidance.

Moreover, increased robustness and accuracy of existing air data systems can be provided by the present method. For example, the present method enables validation/checking of existing air data system airspeed output when particles are available, for zero added cost to the user.

In addition, many environments with high particulate counts are also potential icing environments, where traditional air data probes fail. The airspeed derived from the particle sensor in these environments can be used to hint at navigation solutions in existing air data systems, making the solutions more accurate and robust.

Further details of various embodiments are described hereafter with reference to the drawings.

FIG. 1 illustrates a system 100 for deriving airspeed, according to one embodiment. The system 100 generally includes a particle sensor assembly 110, and a processor unit 130 in operative communication with particle sensor assembly 110. The particle sensor assembly 110 and processor 130 can be deployed on a vehicle, such as an aircraft.

The particle sensor assembly 110 comprises at least one light source, such as a laser transmitter 112, which is configured to transmit a light beam 114 into an external interrogation air region 116. A set of receive optics 118 in particle sensor assembly 110 is configured to provide at least one receive channel. The receive optics 118 are configured to collect a scattered portion 120 of transmitted light beam 114 from at least one particle 122 in interrogation air region 116. In one embodiment, laser transmitter 112 and receive optics 118 can be implemented in an optical transceiver.

An optical detector 124 in particle sensor assembly 110 is in communication with the receive channel and is configured to receive the collected scattered portion 120. The optical detector 124 is operative to measure a signal intensity as a function of time from scattered portion 120. The signal intensity indicates a size of particle 122, and a signal duration indicates a time of flight of particle 122 through interrogation air region 116.

The processor unit 130 is configured to receive input data from optical detector 124. The processor unit 130 is operative to determine a transit time of particle 122 through interrogation air region 116 based on the signal duration (block 132); determine a size of particle 122 based on the signal intensity (block 134); and compute an estimated airspeed based on the transit time, the size of particle 122, and a size of light beam 114 (block 136). The estimated airspeed data is then output from processor unit 130 to other systems, such as a vehicle computer for use in further vehicle data processing. For example, when the vehicle is an aircraft, the processor unit 130 sends the estimated airspeed to an avionics unit onboard the aircraft for further data processing.

Figure 2:
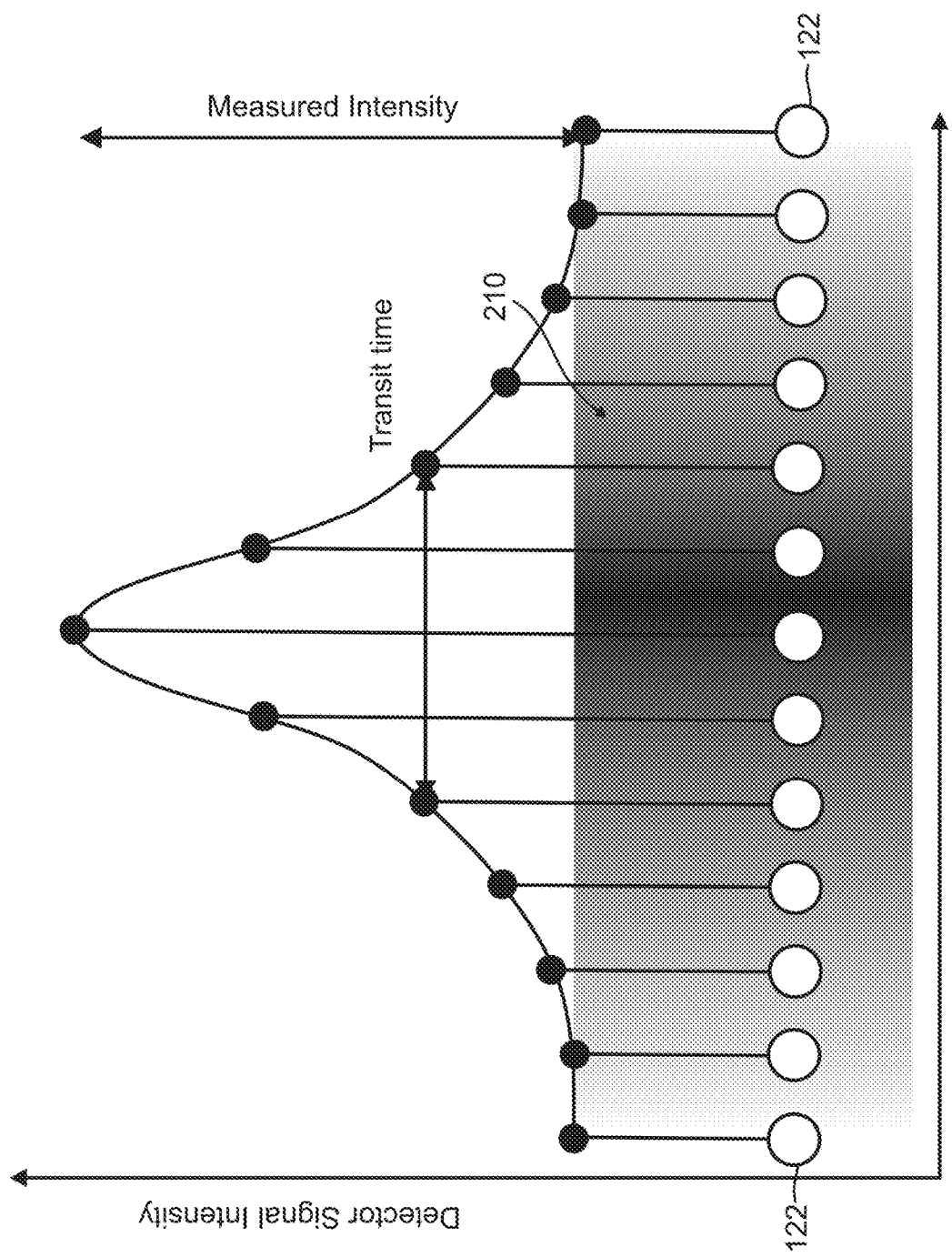
FIG. 2 is a graphical depiction of the operation of the system of FIG. 1, showing the direction of particle motion with respect to detector signal intensity, where the shaded region represents the intensity of the light source along the path of the particle.

FIG. 2 is a graphical depiction of the operation of system 100, showing the direction of particle motion for particle 122 with respect to the detector signal intensity and the intensity of the light source. A shaded region 210 represents the intensity of the light source along the path of particle 122, with an increasing intensity of the light source represented by the increasing darkening of shaded region 210.

In order to determine the airspeed from a particle signal, the primary piece of information obtained is the particle transit time, which is computed from the duration of the detector's signal as a function of time. The particle size is obtained from the intensity. The particle size can also be used as part of the airspeed calculation, but is a correction to the transit time information, which becomes important as the particle gets larger. In one implementation, the particle transit time is the Full Width Half Max (FWHM) of the detector's signal.

In one implementation of the present method, the collected particle data contains both the size of the particle (in microns) and the particle transit time (in seconds). In one version, the present algorithm takes the particle transit time (tt) in seconds, and then uses a known size of the light beam width (w) to calculate an estimated true airspeed according to the following equation:

$$\text{Airspeed} = w/(tt) \quad (1)$$

In another version, the algorithm additionally takes into account the diameter of the particle (d), according to the following equation:

$$\text{Airspeed} = (w+d)/(tt) \quad (2)$$

In a further version, the algorithm uses the convolution of the shape functions of the light beam (L), and particle (P), to derive an expected detector time trace function (D), according to the following equation:

$$D = (L*P) \quad (3)$$

and computes the expected transit time from the detector time trace function. This can be done for a variety of particle size and airspeed combinations to build a two-dimensional look up table, where the transit time and particle size are used as inputs to look up the expected airspeed.

The particle by particle airspeed can then be averaged over some time frame (e.g., 1-30 s) to generate an average estimate. This serves to increase the accuracy of the estimated airspeed but at the expense of response time. The exact averaging window needs to be a balance of these two factors.

Figure 3:
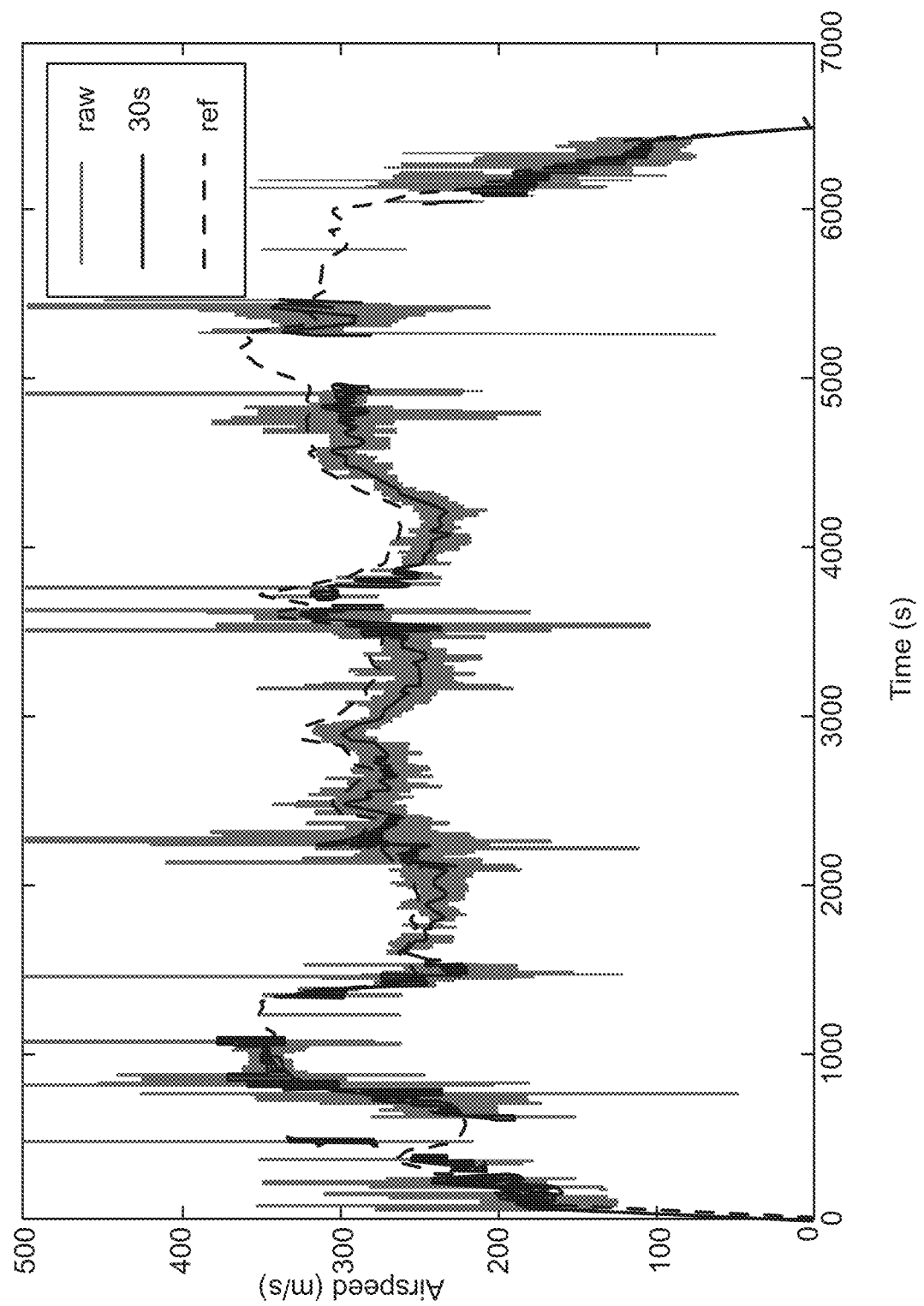
FIG. 3 is a graph showing the results of a test case, in which actual airspeed data generated by an air data computer was compared to estimated airspeed data generated from a particle sensor, in which particle filtering was done to correct errors in the estimated airspeed data.

FIG. 3 is a graph showing the results of a test case, in which actual airspeed data generated by an air data computer was compared to estimated airspeed data generated from a particle sensor, with particle filtering done to correct errors in the estimated airspeed data. The graph of FIG. 3 shows plots of true airspeed (TAS) with respect to a given time frame over a flight envelope, including raw particle data (median of all particles within a given second), a 30 s rolling mean of the particle data, and reference data from the air data computer. The particle derived airspeed was calculated using equation (2) above.

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system comprising a particle sensor assembly that comprises at least one light source configured to transmit a light beam into an external interrogation air region; a set of receive optics configured to provide at least one receive channel, the receive optics configured to collect a scattered portion of the transmitted light beam from at least one particle in the interrogation air region; and an optical detector in communication with the at least one receive channel and configured to receive the collected scattered portion of the transmitted light beam, the optical detector operative to measure a signal intensity as a function of time from the scattered portion, the signal intensity indicating a particle size and a signal duration indicating motion of the at least one particle through the interrogation air region. A processor is in communication with the optical detector, the processor operative to determine a transit time of the at least one particle through the interrogation air region based on the signal duration; and compute an airspeed based on parameters comprising the transit time and a size of the light beam.

Example 2 includes the system of Example 1, wherein the at least one light source comprises a laser transmitter.

Example 3 includes the system of Example 2, wherein the laser transmitter and the receive optics are implemented in an optical transceiver.

Example 4 includes the system of any of Examples 1-3, wherein the processor is further operative to determine a size of the at least one particle based on the signal intensity; and compute an airspeed based on parameters comprising the transit time, the size of the at least one particle, and the size of the light beam.

Example 5 includes the system of any of Examples 1-4, wherein the optical detector comprises a particle by particle detector that is configured to record the transit time of each particle in the interrogation air region, allowing for derivation of true airspeed (TAS), and/or indicated airspeed (IAS), and/or calibrated airspeed (CAS), from the transit time and size of each particle.

Example 6 includes the system of any of Examples 1-5, wherein the particle sensor assembly and the processor are deployed on a vehicle.

Example 7 includes the system of Example 6, wherein the vehicle is an aircraft.

Example 8 includes the system of Example 7, wherein the processor is further operative to send the airspeed to an avionics unit onboard the aircraft.

Example 9 includes a method comprising providing a particle sensor assembly onboard a vehicle, the particle sensor assembly including at least one light source, a set of receive optics configured to provide at least one receive channel, and an optical detector in communication with the at least one receive channel; transmitting a light beam from the at least one light source into an external interrogation air region; collecting in the receive optics, a scattered portion of the transmitted light beam from at least one particle in the interrogation air region; receiving in the optical detector, the collected scattered portion of the transmitted light beam from the at least one receive channel; measuring a signal intensity as a function of time from the scattered portion, the signal intensity indicating a particle size and a signal duration indicating motion of the at least one particle through the interrogation air region; determining a transit time of the at least one particle through the interrogation air region based on the signal duration; and computing an airspeed based on parameters comprising the transit time, and a size of the light beam.

Example 10 includes the method of Example 9, wherein the at least one light source comprises a laser transmitter.

Example 11 includes the method of Example 10, wherein the laser transmitter and the receive optics are implemented in an optical transceiver.

Example 12 includes the method of any of Examples 9-11, further comprising determining a size of the at least one particle based on the signal intensity; wherein the airspeed is computed based on parameters comprising the transit time, the size of the at least one particle, and the size of the light beam.

Example 13 includes the method of any of Examples 9-12, wherein the optical detector comprises a particle by particle detector that is configured to record the transit time of each particle in the interrogation air region, allowing for derivation of true airspeed (TAS), and/or indicated airspeed (IAS), and/or calibrated airspeed (CAS), from the transit time and size of each particle.

Example 14 includes the method of any of Examples 9-13, wherein the vehicle is an aircraft.

Example 15 includes the method of Example 14, further comprising sending the airspeed to an avionics unit onboard the aircraft.

Example 16 includes the method of any of Examples 9-15, wherein a particle by particle estimated airspeed is averaged over a time frame to generate an average estimated airspeed.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
   a particle sensor onboard a vehicle, the particle sensor provided to one side of an external interrogation air region, the particle sensor comprising:
   at least one light source configured to transmit a light beam into the external interrogation air region;
   a set of receive optics configured to provide at least one receive channel, the receive optics configured to collect a scattered portion of the transmitted light beam from at least one particle in the external interrogation air region; and
   an optical detector in communication with the at least one receive channel and configured to receive the collected scattered portion of the transmitted light beam, the optical detector operative to measure a signal intensity as a function of time from the scattered portion, the signal intensity indicating a particle size and a signal duration indicating motion of the at least one particle through the external interrogation air region; and
   a processor in communication with the optical detector, the processor operative to:

determine a transit time of the at least one particle through the external interrogation air region based on the signal duration;

determine a size of the at least one particle based on the signal intensity; and compute an estimated airspeed based on parameters comprising the transit time, the size of the at least one particle, and a size of the light beam.

2. The system of claim 1, wherein the at least one light source comprises a laser transmitter.

3. The system of claim 2, wherein the laser transmitter and the receive optics are implemented in an optical transceiver configured to collect a scattered portion of the transmitted light beam.

4. The system of claim 1, wherein the processor is further operative to:

compute the estimated airspeed based on the parameters comprising the transit time, the size of the at least one particle, and the size of the light beam using the following equation:

estimated airspeed $=(w+d)/(tt)$ where w is a width of the light beam, d is a diameter of the at least one particle, and tt is the transit time of the at least one particle.

5. The system of claim 1, wherein the optical detector comprises a particle by particle detector that is configured to record the transit time of each particle in the external interrogation air region, allowing for derivation of true airspeed (TAS), and/or indicated airspeed (IAS), and/or calibrated airspeed (CAS), from the transit time and size of each particle.

6. The system of claim 1, wherein the particle sensor assembly and is configured to operate in a potential icing environment.

7. The system of claim 1, wherein the vehicle is an aircraft.

8. The system of claim 7, wherein the processor is further operative to send the estimated airspeed to an avionics unit onboard the aircraft.

9. A method for an aircraft, the method comprising:

providing a particle sensor onboard the aircraft a vehicle, and a processor;

providing the particle sensor to one side of an external interrogation air region, the particle sensor comprising at least one light source, a set of receive optics configured to provide at least one receive channel, the receive optics collocated with the at least one light source, and an optical detector in communication with the at least one receive channel;

transmitting a light beam from the at least one light source into the external interrogation air region;

collecting in the receive optics, a scattered portion of the transmitted light beam from at least one particle in the external interrogation air region;

receiving in the optical detector, the collected scattered portion of the transmitted light beam from the at least one receive channel; and measuring with the optical detector, a signal intensity as a function of time from the scattered portion, the signal intensity indicating a particle size and a signal duration indicating motion of the at least one particle through the external interrogation air region;

wherein the processor is in communication with the optical detector, and the processor performs a method comprising:

determining a transit time of the at least one particle through the external interrogation air region based on the signal duration;

determining a size of the at least one particle based on the signal intensity; and computing an estimated airspeed based on parameters comprising the transit time, the size of the at least one particle, and a size of the light beam.

10. The method of claim 9, wherein the at least one light source comprises a laser transmitter.

11. The method of claim 10, wherein the laser transmitter and the receive optics are implemented in an optical transceiver that collects a scattered portion of the transmitted light beam.

12. The method of claim 9, wherein:

the estimated airspeed is computed based on the parameters comprising the transit time, the size of the at least one particle, and the size of the light beam using the following equation:

estimated airspeed $=(w+d)/(tt)$ where w is a width of the light beam, d is a diameter of the at least one particle, and tt is the transit time of the at least one particle.

13. The method of claim 9, wherein the optical detector comprises a particle by particle detector that is configured to record the transit time of each particle in the external interrogation air region, allowing for derivation of true airspeed (TAS), and/or indicated airspeed (IAS), and/or calibrated airspeed (CAS), from the transit time and size of each particle.

14. The method of claim 9, further comprising:

sending the estimated airspeed to an avionics unit onboard the aircraft.

15. The method of claim 9, wherein a particle by particle estimated airspeed is averaged over a time frame to generate an average estimated airspeed.

* * * * *

UNITED STATES PATENT AND TRADEMARK OFFICE
CERTIFICATE OF CORRECTION

PATENT NO. : 11,525,841 B2
APPLICATION NO. : 15/957629
DATED : December 13, 2022
INVENTOR(S) : Wienkes et al.

Page 1 of 1

It is certified that error appears in the above-identified patent and that said Letters Patent is hereby corrected as shown below:

In the Claims

At Column 7, Line 33, please replace "wherein the particle sensor assembly and is configured" with --wherein the particle sensor is configured--.

At Column 7, Line 41, please replace "onboard the aircraft a vehicle, and" with --onboard the aircraft, and--.

Signed and Sealed this
Twenty-fourth Day of January, 2023

Katherine Kelly Vidal
*Director of the United States Patent and Trademark Office*